United States Patent [19]

Borchardt et al.

[11] Patent Number: 4,925,593

[45] Date of Patent: May 15, 1990

[54] METHOD FOR PRODUCING CADMIUM FREE GREEN EMITTING CRT PHOSPHOR

[75] Inventors: Richard R. Borchardt; Richard G. W. Gingerich; Michael J. Miller, all of Towanda, Pa.

[73] Assignee: GTE Products Corporation, Stamford, Conn.

[21] Appl. No.: 303,599

[22] Filed: Jan. 27, 1989

[51] Int. Cl.$^5$ .............................................. C09K 11/56
[52] U.S. Cl. ................................................ 252/301.6 S
[58] Field of Search .................................. 252/301.6 S

[56] References Cited

U.S. PATENT DOCUMENTS

| | | | |
|---|---|---|---|
| 2,623,858 | 12/1952 | Kroger | 252/301.6 S |
| 2,743,240 | 4/1956 | Froelich | 252/301.6 S |
| 3,655,575 | 4/1972 | Faria et al. | 252/301.6 |
| 3,691,088 | 9/1972 | Pelton | 252/301.6 |
| 3,704,232 | 9/1970 | Frey et al. | 252/301.6 |
| 4,038,205 | 7/1977 | Minnier et al. | 252/301.6 S |
| 4,140,940 | 2/1979 | Vehara et al. | 252/301.6 S |
| 4,272,397 | 6/1981 | Fukuda et al. | 252/301.6 S |
| 4,814,666 | 3/1989 | Iwasaki et al. | 252/301.6 S |

FOREIGN PATENT DOCUMENTS

| | | | |
|---|---|---|---|
| 49-47273 | 5/1974 | Japan | 252/301.6 S |
| 57-95098 | 6/1982 | Japan | 252/301.6 S |
| 57-139171 | 8/1982 | Japan | 252/301.6 S |

*Primary Examiner*—Jack Cooper
*Attorney, Agent, or Firm*—Donald R. Castle

[57] ABSTRACT

A cadmium-free cathodoluminescent phosphor composition consists essentially of zinc sulfide activated with from about 0.019% by weight to about 0.024% by weight of copper and from about 0.01% by weight of about 0.02% by weight of aluminum wherein the emission of the phosphor upon stimulation by cathode rays has CIE values of x of from 0.287 to 0.291 and y from 0.616 to 0.620. The process involves solid state heating of the various raw materials wherein a first relatively pure zinc sulfide and a second zinc sulfide containing chloride ions are mixed with the appropriate levels of and alkali metal chloride and sources of copper and aluminum activators and then heated in a nitrogen-carbon disulfide atmosphere for about 3 hours at 1775° C. to about 1825° C.

6 Claims, No Drawings

4,925,593

METHOD FOR PRODUCING CADMIUM FREE GREEN EMITTING CRT PHOSPHOR

FIELD OF INVENTION

This invention relates to green emitting cathodoluminescent phosphors. More particularly, it relates to a green emitting cathodoluminescent (CRT) phosphor that is cadmium free and a process for producing same.

BACKGROUND

Prior to the present invention, CRT phosphors having x color coordinates of from about 0.287 to about 0.291 and y color coordinates of from about 0.616 to about 0.620 were typically zinc cadmium sulfide activated with copper and aluminum. Typical process for producing same are found in U.S. Pat. Nos. 3,704,232, 3,691,088 and 3,655,575.

There are current environmental restrictions against the use of cadmium containing compounds. Therefore, the production of a cadmium-free CRT phosphor having the aforementioned emission characteristics would be an advancement in the art.

SUMMARY OF THE INVENTION

In accordance with one aspect of this invention there is provided a cathodoluminescent phosphor composition consisting essentially of zinc sulfide activated with from about 0.019% by weight to about 0.024% by weight of copper and from about 0.01% by weight to about 0.020% by weight of aluminum wherein the emission of the phosphor upon stimulation by cathode rays has CIE values of x of from 0.287 to 0.291 and y from 0.616 to 0.620.

In accordance with an additional aspect of this invention there is provided a process for producing a cadmium free green emitting cathodoluminescent phosphor comprising (a) forming a relatively uniform admixture by blending essentially equal amounts of first and second zinc sulfides wherein the first zinc sulfide is essentially pure zinc sulfide and the second zinc sulfide contains from about 0.075% by weight to about 2% by weight of chloride ions, a sufficient amount of a source of copper and a source of aluminum to yield a concentrations of from about 0.015% by weight to about 0.025% by weight of copper and from about 0.02% by weight to about 0.04% by weight of aluminum and a sufficient amount of an alkali metal chloride flux to yield a concentration of from about 5% to about 8% by weight of the total admixture, (b) firing the admixture at a temperature of from about 1775° C. to about 1825 ° C. for at least about 3 hours in an atmosphere of nitrogen and carbon disulfide (c) washing the resulting fired material with sufficient water until the conductivity of the supernatent water is below about 10 micromhos and (d) drying the washed phosphor to remove residual water.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

A relatively homogeneous admixture of two different zinc sulfides, a suitable flux and the activators at their proper concentrations is prepared. While wet blending can be used it merely adds to the cost of the process, there the uniform admixture is preferably achieved by dry blending in any conventional dry blender with relatively mild agitation thereby preventing appreciable reduction of the particle size of the initial materials. The first zinc sulfide is essentially pure zinc sulfide having an average particle size of from about 2.0 to about 3.0 micrometers as measured by Fischer Subsieve Size (FSSS). The first zinc sulfide used should not contain more than about 0.01% of chloride and no more than 0.5% of other impurities. The second zinc sulfide contains from about 0.075% by weight to about 2% by weight of chloride ions and has an average particle size of from about 3.0 to about 5.0 micrometers as measured by FSSS. As with the first zinc sulfide, the impurity content other than the chloride should be less than about 0.5% by weight.

The sources of the components used as the activator material are in general the metal salts of the mineral acids such as nitrates, sulfates, chlorides and the like. The metal salts are mixed with the zinc sulfide to yield an admixture containing from about 0.015% to about 0.025% parts by weight of copper and from about 0.02% by weight to about 0.04% by weight of aluminum. About 0.02% by weight and about 0.03% by weight of aluminum are the preferred levels of activator sources used initially. Because of the firing condition not all of the activators are incorporated into the material, however, under the combination of conditions set forth herein the material having the desired color coordinate contains from about 0.019% by weight to about 0.02% by weight of copper and from about 0.01% to about 0.02% by weight of aluminum in the final product.

Alkali metal chloride are the fluxes used in the practice of this invention. The initial admixture will contain from about 5% to about 8% by weight of the total admixture, with about 6.6% by weight of sodium chloride being especially preferred.

The heating temperature is closely controlled at from about 1775° C. to about 1825° C. An atmosphere such as that described in U.S. Pat. No. 3,704,232 is used during the firing or heating step. The material is fired at the foregoing temperature for at least about 3 hours. Longer times can be used, however, times in excess of about 6 hours are not generally used because such times needlessly add to the cost of the process.

After the material is fired it is washed with water sufficiently to achieve a conductivity of the supernatent wash water of less than about 10 micromhos, therefore, deionized water is generally used. Multiple washes are generally required to achieve sufficient removal of excess ions to achieve the lower conductivity.

After the foregoing washing step has removed the excess flux and unincorporated activator, the material is air dried as screened through a 400 mesh screen.

In order to more fully illustrate the preferred embodiments of the this invention, the following detailed example is given. All parts, proportions and percentages are by weight unless otherwise given.

EXAMPLE 1

Equal amounts by weight of a chloride-free zinc sulfide and a chloride-containing zinc sulfide, including activator materials is prepared. The formula, contained the equivalent of about 0.02% by weight of Cu activator and about 0.03% by weight of aluminum activator based on the total weight of the formulation sodium chloride flux added in the amount of 6.6% by weight of the above active ingredients.

After dry blending for about 20 minutes, the above mixture is transferred to a silica boat and fired at 1800° F. under an $N_2$ and $CS_2$ atmosphere for 3-4 hours. The finished product is then cooled to room temperature. The product is cooled initially under an $N_2$ atmosphere for 15 minutes, and thereafter allowed to cool in the open air under ambient room conditions. The product is then washed 3-4 times with hot deionized water until the conductivity of the supernate is reduced below 10 micromhos. The bulk of the water is then removed by filtration and the product is transferred to an air circulating oven and dried for about 16 hours at 160° C. The dried product is then sieved through a 400 mesh stainless steel sieve. Color analysis on the sieved product yielded the following C.I.E. color coordinates: X=291, y=0.617.

EXAMPLE 2

Following a similar process as described in Example 1 except that various variables as listed in the following table are varied. Temperatures, size of the zinc sulfide, ratio of the chloride containing zinc sulfide to the chloride-free zinc sulfide are varied. The amounts of flux, and activator level and time of heating and cooling are also varied.

TABLE I

| Sample | Firing Temperature (°F.) | Cu (PPM) | Al (PPM) | NaCl (WT. %) | ZnS PS* (FSSS) | Furnace Stoke Rate (Min.) | Sample Cooling Time Under $N_2$ | Chloride Containing ZnS % | Color Coordinates X | Y |
|---|---|---|---|---|---|---|---|---|---|---|
| 1 | 1750 | 250 | 400 | 5.6 | 2.11 | 10 | 20 | 100 | .283 | .612 |
| 2 | 1750 | 150 | 400 | 7.6 | 1.91 | 20 | 20 | 0 | .282 | .604 |
| 3 | 1800 | 200 | 300 | 6.6 | 3.14 | 15 | 15 | 50 | .291 | .617 |
| 4 | 1750 | 250 | 200 | 5.6 | 2.28 | 20 | 20 | 0 | .287 | .614 |
| 5 | 1750 | 150 | 400 | 5.6 | 4.00 | 20 | 10 | 100 | .285 | .612 |
| 6 | 1850 | 150 | 400 | 7.6 | 2.11 | 10 | 10 | 100 | .285 | .611 |
| 7 | 1800 | 200 | 300 | 6.6 | 3.14 | 15 | 15 | 50 | .290 | .618 |
| 8 | 1850 | 150 | 200 | 5.6 | 2.11 | 20 | 20 | 100 | .277 | .611 |
| 9 | 1850 | 250 | 200 | 7.6 | 1.91 | 10 | 20 | 0 | .283 | .610 |
| 10 | 1750 | 250 | 400 | 7.6 | 2.28 | 10 | 10 | 0 | .289 | .614 |
| 11 | 1750 | 150 | 200 | 7.6 | 4.00 | 10 | 20 | 100 | .284 | .614 |
| 12 | 1800 | 200 | 300 | 6.6 | 3.14 | 15 | 15 | 50 | .293 | .617 |
| 13 | 1850 | 150 | 200 | 7.6 | 2.28 | 20 | 10 | 0 | .266 | .597 |
| 14 | 1850 | 250 | 400 | 5.6 | 1.91 | 20 | 10 | 0 | .280 | .594 |
| 15 | 1850 | 150 | 400 | 5.6 | 2.28 | 10 | 20 | 0 | .276 | .600 |
| 16 | 1850 | 250 | 200 | 5.6 | 4.00 | 10 | 10 | 100 | .286 | .614 |
| 17 | 1750 | 150 | 200 | 5.6 | 1.91 | 10 | 10 | 0 | .282 | .611 |
| 18 | 1850 | 250 | 400 | 7.6 | 4.00 | 20 | 20 | 100 | .270 | .603 |
| 19 | 1800 | 200 | 300 | 6.6 | 3.14 | 15 | 15 | 50 | .291 | .617 |
| 20 | 1750 | 250 | 200 | 7.6 | 2.11 | 20 | 10 | 100 | .268 | .599 |

*Particle Size

The results, as reported in Table 1 show that the correct color is obtained with samples 3, 7, 12 and 19.

While there has been shown and described what considered the preferred embodiments of the invention, it will be obvious to those skilled in the art that various changes and modifications may be made therein without departing from the scope of the invention as defined by the appended claims.

What is claimed is:

1. A process for producing a cadmium free green emitting cathodoluminescent phosphor consisting essentially of zinc sulfide activated by copper and aluminum wherein the emission of the phosphor upon stimulation by cathode rays has CIE values of X of from 0.287 to 0.291 and y from 0.616 to 0.620 comprising:
   (a) forming a relatively uniform admixture by blending essentially equal amounts of first and second zinc sulfides wherein the first zinc sulfide is essentially pure zinc sulfide containing no more than 0.01% of chloride and no more than 0.5% of other impurities and the second zinc sulfide contains from about 0.075% by weight to about 2% by weight of chloride ions and no more than 0.5% by weight of other impurities, a sufficient amount of a source of copper and a source of aluminum to yield concentrations of from about 0.015% by weight to about 0.025% by weight of copper and from about 0.02% by weight to about 0.04% by weight of aluminum and a sufficient amount of an alkali metal chloride flux to yield a concentration of from about 5 to about 8% by weight of the total admixture,
   (b) firing the admixture at a temperature of from about 1775° C. to about 1825° C. for at least about 3 hours in an atmosphere of nitrogen and carbon disulfide,
   (c) washing the resulting fired material with sufficient water until the conductivity of the supernatent water is below about 10 micromhos, and
   (d) drying the washed phosphor to remove residual water.
2. A process according to claim 1 wherein said alkali metal chloride is sodium chloride.
3. A process according to claim 1 wherein said temperature is about 1800° C.
4. A process according to claim 1 wherein the source of copper is copper sulfate.
5. A process according to claim 1 wherein the source of aluminum is aluminum chloride.
6. A process according to claim 1 wherein the particle size of the first zinc sulfide is from about 2.0 micrometers to about 3.0 micrometers as measured by Fisher Subsieve Size and the particle of the second sulfide is from about 3.0 to 5.0 micrometers as measureed by Fisher Subsieve Size.

* * * * *

UNITED STATES PATENT AND TRADEMARK OFFICE
CERTIFICATE OF CORRECTION

PATENT NO. : 4,925,593

DATED : May 15, 1990

INVENTOR(S) : Richard R. Borchardt; Richard G.W. Gingerich; Michael J. Miller It is certified that error appears in the above-identified patent and that said Letters Patent is hereby corrected as shown below:

Col. 1, line 47: after "yield", delete "a".

Col. 2, line 32: after "weight", insert --of copper--.

Col. 3, line 25: "291" should be --0.291--.

Col. 4, line 28: "supernatent" should be --supernatant--.

Signed and Sealed this

Twenty-ninth Day of October, 1991

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,925,593
DATED : May 15, 1990
INVENTOR(S) : Richard R. Borchardt; Richard G.W. Gingerich; Michael J. Miller It is certified that error appears in the above—identified patent and that said Letters Patent is hereby corrected as shown below:

Abstract: "$1775^{\circ}C$" should be "$1775^{\circ}F$" (line 14)
"$1825^{\circ}C$" should be "$1825^{\circ}F$" (line 15)

Col. 1, line 55: "$1775^{\circ}C$" should be "$1775^{\circ}F$" and
"$1825^{\circ}C$" should be "$1825^{\circ}F$"

Col. 2, line 48: "$1775^{\circ}C$" should be "$1775^{\circ}F$" and
"$1825^{\circ}C$" should be "$1825^{\circ}F$"

Col. 4, line 24: "$1775^{\circ}C$" should be "$1775^{\circ}F$" and
"$1825^{\circ}C$" should be "$1825^{\circ}F$"

Col. 4, line 35: "$1800^{\circ}C$" should be "$1800^{\circ}F$"

Col. 2, line 14: delete "micrometers"

Col. 2, line 20: delete "micrometers"

Col. 6, lines 63-64: delete "micrometers" (two occurrences)

Col. 6, line 66: delete "micrometers"

Signed and Sealed this

Sixteenth Day of November, 1993

*Attest:*

BRUCE LEHMAN

*Attesting Officer*   *Commissioner of Patents and Trademarks*